United States Patent
Steenson, Jr. et al.

(10) Patent No.: US 10,077,970 B2
(45) Date of Patent: Sep. 18, 2018

(54) SYSTEM AND METHOD FOR STORES COMMUNICATIONS

(71) Applicant: BAE SYSTEMS Information and Electronic Systems Integration Inc., Nashua, NH (US)

(72) Inventors: James H Steenson, Jr., New Boston, NH (US); David M Gillespie, Manchester, NH (US); Derek P Janiak, Manchester, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 15/376,014

(22) Filed: Dec. 12, 2016

(65) Prior Publication Data
US 2018/0164076 A1 Jun. 14, 2018

(51) Int. Cl.
*F41G 7/00* (2006.01)
*H04L 12/40* (2006.01)
*F41G 7/22* (2006.01)

(52) U.S. Cl.
CPC .............. *F41G 7/007* (2013.01); *F41G 7/001* (2013.01); *F41G 7/226* (2013.01); *F41G 7/2293* (2013.01); *H04L 12/40006* (2013.01); *H04L 2012/4028* (2013.01)

(58) Field of Classification Search
CPC .......... F41G 7/007; F41G 7/001; F41G 7/226; F41G 7/2293; H04L 12/40006; H04L 2012/4028

USPC .......................................................... 235/404
See application file for complete search history.

(56) References Cited

U.S. PATENT DOCUMENTS

| | | | |
|---|---|---|---|
| 4,438,675 A | 3/1984 | Fischer et al. | |
| 5,052,271 A * | 10/1991 | West | B64D 1/04 89/1.55 |
| 7,698,983 B1 * | 4/2010 | Pinto | F42C 17/00 102/275.11 |
| 2005/0061191 A1 * | 3/2005 | Dietrich | F42C 17/04 102/215 |

(Continued)

OTHER PUBLICATIONS

U.S. Appl. No. 11/456,372, Office Action dated Oct. 2, 2009, 8 pages.

(Continued)

*Primary Examiner* — Daniel Hess
(74) *Attorney, Agent, or Firm* — Maine Cernota & Rardin; Scott J. Asmus (57) ABSTRACT

A system for transferring power and/or data between a host and a store over a single-wire umbilical cable is herein described. The system comprises a host-store interface configured to allow the transfer of both power and data between the host and a store in operative communication therewith. The store comprises a microcontroller and memory operatively coupled thereto, allowing the microcontroller to be powered on and to receive and store data sent by the host in its memory through a single-wire without requiring additional electronic systems that the store may comprise to also be powered on. This data may later be incorporated into pre-programmed systems onboard the store at full power-on, thereby enabling the reprogramming of the store without powering it on prior to launch.

15 Claims, 8 Drawing Sheets

(56) References Cited

U.S. PATENT DOCUMENTS

2008/0006169 A1\* 1/2008 Geswender ............. F42C 17/04
                                                    102/430
2011/0226038 A1\* 9/2011 Donahoe ................... F42B 6/04
                                                    73/12.05

OTHER PUBLICATIONS

U.S. Appl. No. 11/456,372, Office Action Response dated Oct. 29, 2009, 9 pages.
U.S. Appl. No. 11/456,372, Office Action dated Aug. 20, 2010, 6 pages.
U.S. Appl. No. 11/456,372, Office Action Response dated Jan. 7, 2011, 8 pages.
U.S. Appl. No. 11/456,372, Office Action dated Mar. 17, 2011, 5 pages.
U.S. Appl. No. 11/456,372, Office Action Response dated Jun. 17, 2011, 9 pages.
U.S. Appl. No. 11/456,372, Notice of Allowance dated Mar. 9, 2012, 7 pages.

\* cited by examiner

SYSTEM AND METHOD FOR STORES COMMUNICATIONS

FIELD

The disclosure relates to the transfer of information from a host to a mission store, such as precision guided munitions, and, in one example, to interfaces for connecting a host to a projectile warhead for, at least, the purposes of data transfer and fault detection.

BACKGROUND

Existing hosts capable of hosting guided projectiles require a guided projectile that is electrically and communicatively connected to the host, which may be an aircraft, Unmanned Aerial Vehicle (UAV), helicopter, jet, satellite or ground based tracking system, or other ground, sky, space or water-based vehicle. Such current hosts require the projectile to be powered-on by either the host's or the projectile's internal power, prior to a decision to launch the projectile and during data transfers, such as during the transfer of mission critical data.

Although there are ways to enable such communications to take place without requiring the projectile to be powered-on, it is significantly more difficult to do so utilizing existing single-wire interface umbilical cords, which are already in widespread use on aircraft, between the host aircraft and the guided projectile. It is even more difficult to achieve this objective without limiting any existing interface capabilities.

While it is important to maintain compatibility with legacy systems without limiting their present functionality, using additional or multi contact interface cables, as opposed to continuing with a single cable interface, is also problematic due to such a solution necessitating a more mechanically complex disconnect process at launch, which will often be under adverse conditions.

Furthermore, present single-cable interface data transfer solutions do not allow projectiles to communicate adverse health issues that may warrant aborting a launch or replacing the problematic projectiles prior to a decision to launch over a relatively simple interface, with solutions capable of providing such information requiring multiple connections and a relatively complex disconnection sequence upon launch.

Additionally, modern laser-guided missiles typically rely on a laser designator to "mark" a target. The missile, once launched, searches for a laser-designated target and uses various forms of directional control to reach the designated target. To allow the firing of multiple missiles by various platforms simultaneously, such laser-designators produce a precision controlled laser-pulse having a very specific pulse interval, among other potential characteristics. Each missile is programmed to lock onto only a specific pulse-interval. Such a pulse-interval is typically set during installation of the missile onto the plane, just prior to launch.

On occasion, it may be desirable for a pilot to be able to reprogram a missile to lock onto a different laser designator. While this is possible using relatively sophisticated multi-cable solutions, it is not currently possible over single-cable interfaces. Furthermore, it is not currently possible without turning the missile on prior to launch.

Moreover, the systems of present aircraft are limited in weight, size and power, requiring the additional functionality enabled by any new system, such as pre-launch data transfer and projectile health checks and reports, to place no high power demand on the host aircraft.

Lastly, the aircraft to projectile guidance and arming system interfaces of current single-cable precision guided projectiles do not currently support the transfer of data, such as is required to enable free inertial navigation capability, perform health checks, or change missile codes, such as those used to match a laser guided missile to a laser designator. One example of a precision guided asset is the Advanced Precision Kill Weapon Systems (APKWS).

Any changes to such systems are relatively unworkable unless changes to current cabling, protocols, etc. are minimal, due to the widespread deployment of legacy systems and the high cost of their replacement.

Also, it is important to only enable a missile's power source just prior to, or even just after, launch to conserve the missile's power, which may be very limited. In various missiles, a thermal battery, which cannot be turned off once enabled and may be depleted in a relatively short period of time, may be used, making it even more important to transfer data without enabling the missile's onboard power source.

What is needed, therefore, are techniques for enabling communications between a projectile and command center that would allow the projectile to report adverse health issues prior to a decision to launch, to change missile codes while in flight, and to gain free inertial navigation capability without requiring the projectile to be powered-on by either the host aircraft's or the projectile's own internal power, where the system utilizes existing umbilical cords for communications and does not limit the functionality of existing systems that may also make use of this aircraft-to-projectile connection.

SUMMARY

One objective of embodiments of the present disclosure is to enable the transfer of mission critical data from a host aircraft to a guided missile, without the guided missile being supplied power over a dedicated connection to the host aircraft or relying on its own internal power, prior to a decision to launch and during data transfers.

Another objective of embodiments of the present disclosure is to allow the missile to signal adverse health issues, prior to a decision to launch, that may warrant aborting a launch.

An additional objective of embodiments of the present disclosure is to allow the missile code, which is used to pair a laser-designator to a laser-guided missile, to be changed mid-flight.

Still another objective of embodiments of the present disclosure is to accomplish the above objectives while placing no high power demand on the host aircraft for purposes of pre-launch data transfer and missile health checks.

A still further objective of embodiments of the present disclosure is to support the transfer of data required to enable free inertial navigation capability and including excess capacity to support the future addition of GPS assisted navigation.

A yet still further objective of embodiments of the present disclosure is to accomplish the above objectives utilizing an existing, or employing a, one wire interface umbilical between the host aircraft and the guided missile, to transfer the mission critical data, without disabling any existing interface capabilities and without requiring additional or multi contact interface cables that would necessitate a mechanically complex disconnect process at launch.

In accomplishing these objectives, simple interfaces and small changes that minimize changes to existing cabling and infrastructure were prioritized over high-bandwidth, two-way communications between precision guided weapon systems and the aircraft, with full pre-power.

It is also important that the ability to integrate information from gyroscopes that may be used to enable inertial navigation is enabled and completed before aircraft launch, otherwise a method for determining rocket attitude post-launch, which would necessarily be more complex than determining pre-launch attitude, would be required.

One embodiment of the present disclosure provides a system for transferring at least one of power and data on a host aircraft over a single-wire umbilical cable, the system comprising: a host-store interface configured to allow the transferring of the least one of power and data on the host aircraft; and a store in operative communication with the host-store interface, the store comprising a microcontroller and memory operatively coupled thereto, wherein the microcontroller is configured to be powered by and receive and store data into the memory from the host-store interface through the single-wire umbilical cable without requiring additional electronic systems of the store be powered on.

Another embodiment of the present disclosure provides such a system wherein the microcontroller and the memory derives power from a data signal provided thereto by the host-store interface.

A further embodiment of the present disclosure provides such a system further comprising a store control system comprising memory having pre-programmed data thereon that is configured to be powered by the store during use of the store.

Yet another embodiment of the present disclosure provides such a system wherein the store control system, upon being powered on, is configured to read the contents of the memory operatively couple to the microcontroller and to replace its own pre-programmed data with data contained on the memory operatively coupled to the microcontroller.

A yet further embodiment of the present disclosure provides such a system wherein the store control system comprises a store guidance system.

Still another embodiment of the present disclosure provides such a system wherein the microcontroller is configured to conduct a pre-launch test of the store and abort a launch if the pre-launch test fails.

A still further embodiment of the present disclosure provides such a system wherein the abort is signaled by shorting at least one of the power and data connections of the host-store interface to ground.

Even another embodiment of the present disclosure provides such a system further comprising a battery configured to provide electrical power to the store, during use, wherein battery activation is achieved by complex messaging, thereby avoiding false triggering.

An even further embodiment of the present disclosure provides such a system wherein transferring data to the store comprises modulating the data and superimposing it on a baseband time delay signal that may also be used for fuse setting, thereby minimizing the need for additional wiring between the host and the store contained thereon.

A still even another embodiment of the present disclosure provides such a system wherein the store is a mission store.

One embodiment of the present disclosure provides a method of reprogramming a mission store prior to launch from a host aircraft comprising: passing a data signal from the host aircraft to a microcontroller contained onboard the store and having memory operatively coupled thereto, wherein the data signal passed to the microcontroller also provides power to the microcontroller, thereby enabling it to function without a provision of further power; communicating data to the microcontroller; writing the data to the memory operatively coupled to the microcontroller; on a store computer system contained on the store and having previously-programmed memory to be reprogrammed, upon powering-on of the store, using the store computer system to read the data from the memory operatively coupled to the microcontroller; comparing the data read from the memory operatively coupled to the microcontroller and the previously-programmed memory of the store computer system; and replacing the contents of the previously-programmed memory of the store computer system with that of the memory operatively coupled to the microcontroller, if differing data is present thereon.

Another embodiment of the present disclosure provides such a method wherein passing of data and power is done using a standard 1-wire umbilical.

A further embodiment of the present disclosure provides such a method wherein the battery is a thermal battery.

Yet another embodiment of the present disclosure provides such a method wherein communication is carried out using a UAI/1760 bus.

A yet further embodiment of the present disclosure provides such a method wherein relevant data comprises inertial navigation system data.

Still another embodiment of the present disclosure provides such a method wherein communicating data to the store comprises modulating the data and superimposing it on a baseband time delay signal that may also be used for fuse setting, thereby minimizing the need for additional wiring between the host and the mission store.

One embodiment of the present disclosure provides a method of verifying the integrity of a mission store prior to launch from a host using a microcontroller with program instructions, comprising: generating an AC power/data signal on a power/data line to convey power and data to a microcontroller; and performing a test on the mission store using the microcontroller, and, if the test fails, providing a signal to the host indicating that the test has failed.

Another embodiment of the present disclosure provides such a method wherein the signal indicating the test has failed comprises shorting the power/data line to ground and further comprising: monitoring the AC impedance of a power/data line; if a short is detected, utilizing a bus to prevent launch and ceasing activity on the power/data line; and approximately 1 sec prior to launch, activating a battery onboard the mission store, thereby powering it on.

A further embodiment of the present disclosure provides such a method wherein passing of power and data is done over a standard 1-wire umbilical cable.

Yet another embodiment of the present disclosure provides such a method wherein communication is carried out using a UAI/1760 bus.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1:
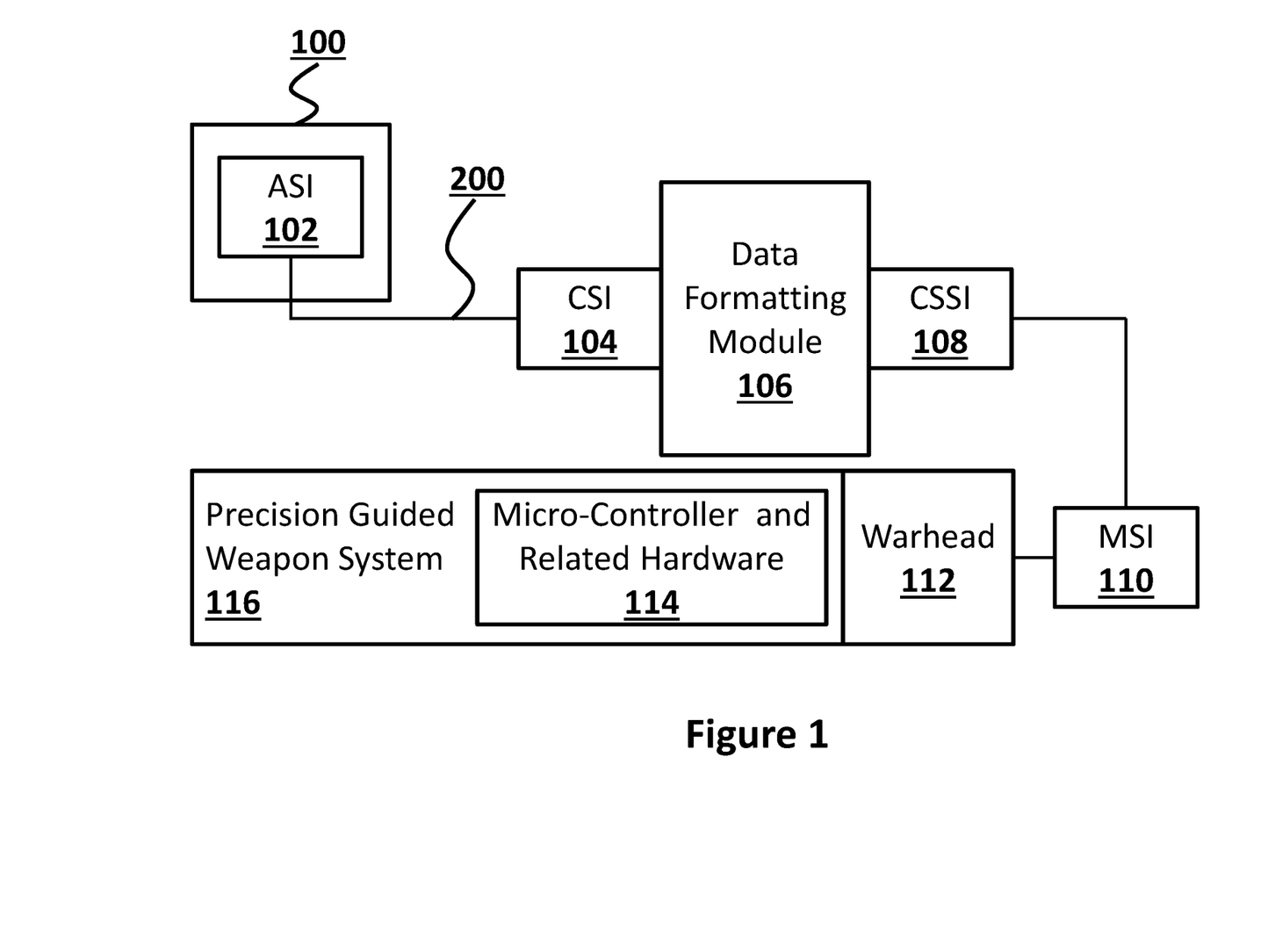
FIG. 1 is a block diagram illustrating an aircraft to warhead data interface, configured in accordance with embodiments of the present disclosure.

Referring to FIG. 1, the present disclosure describes improved interfaces for connecting a host, such as an aircraft 100, to stores, wherein stores are broadly defined as any device intended for internal or external carriage and mounted on aircraft suspension and release equipment, whether or not the item is intended to be separated in flight from the aircraft, including permanent devices such as electronic countermeasures (ECMs), Low Altitude Navigation and Targeting Infrared for Night (LANTIRN), fuel tanks, and devices such as bombs, rockets and missiles.

Stores are further subdivided into three categories, namely carriage stores, mission stores and dispensers. Carriage store refers to suspension and release equipment that is mounted on aircraft on a non-permanent basis as a store and that is intended to carry other MIL-STD-1760 compatible store(s). Carriage stores include both single adapters and multiple store carriers. Pylons and primary racks (such as an MAU-12 and BRU-10) will not be considered carriage stores under this definition.

Mission store refers to all stores that directly support a specific mission of an aircraft, excluding carriage stores and dispensers. Mission stores include, but are not limited to, missiles, rockets, bombs, torpedoes, buoys, flares, pods, fuel tanks, nuclear weapons, torpedoes, pyrotechnic devices, sonobuoys, drones, and target and cargo drop containers. Mission stores may contain embedded 1553 RTs (remote terminals) that are capable of BC-RT, RT-BC and RTRT message transfers with a host aircraft 100 functioning as a bus controller.

Dispensers include equipment that is mounted on an aircraft on a non-permanent basis and includes, but is not limited to, chaff and flare dispensers, rocket pods, and small munitions dispensers.

The present system provides for an interface between the host and mission stores. An aircraft 100, as used in this disclosure, should be understood to encompass any vehicle designed to be supported by air, being borne up either by the dynamic action of the air upon the surfaces of the vehicle, or by its own buoyancy. The term includes fixed and movable wing aircraft, helicopters, gliders, unmanned aerial vehicles (UAVs) and airships, but excludes projectiles such as air-launched missiles, rockets, target drones and flying bombs. Although embodiments of the present disclosure are described in relation to their use and configuration on aircraft 100, the disclosure should not be construed to be so limited, as one of ordinary skill in the art would realize that the teachings set out herein would apply equally to other command center assets, including ground and water-based vehicles as well as space-based systems.

Existing interfaces allow a host aircraft 100 to be connected to, among other mission stores, certain families of warheads. Such interfaces typically comprise at least one wire extending between an Aircraft Station Interface (ASI) 102 and the front of a warhead 112. This wire 200 may be configured to carry a baseband, low-frequency signal to the warhead 100 for purposes of setting a fuse detonation delay time prior to launch. Variations of precision guided weapon systems 116, such as the Advanced Precision Kill Weapon Systems (APKWS) missile guidance systems that are in current use, typically do not interface to warheads 112 directly.

Future implementations of precision guided weapon systems 116 are expected to require inertial guidance for at least portions of missions, which requires timely information, including information about the relative positions of a target and the projectile, to be available to precision guided weapon systems 116 guidance section prior to beginning guidance.

Also, it is desirable to be able to change a laser code assigned to the precision guided weapon systems 116 after loading into a launch tube. Laser codes are used on various laser-guided rockets to allow such rockets to utilize specific laser designators, allowing the targeting of different objects by simultaneously fired rockets. This data is readily available on the host aircraft 100 data bus(es), however, a means of getting the data to the precision guided weapon systems 116 guidance system is required to enable such additional functionality.

Now referring to FIG. 1 a block diagram illustrating an aircraft 100 to projectile 116 data interface, configured in accordance with embodiments of the present disclosure, is shown. In embodiments configured in accordance with FIG. 1, an aircraft 100 typically employs an aircraft station interface (ASI) 102. The ASI 102 is the interface on the aircraft 100 structure where the mission or carriage store is connected.

In this context, AEIS (Aircraft-Store Electrical Interconnection System) is used to refer to an aircraft-store electrical interconnection system, which is a system composed of electrical, and possibly fiber optic, interfaces on aircraft 100 and stores through which aircraft 100 energize, control and employ stores. An AEIS comprises electrical interfaces necessary for the transfer of electrical power and data between aircraft 100 and stores and from one store to another store via the aircraft 100.

Figure 2:
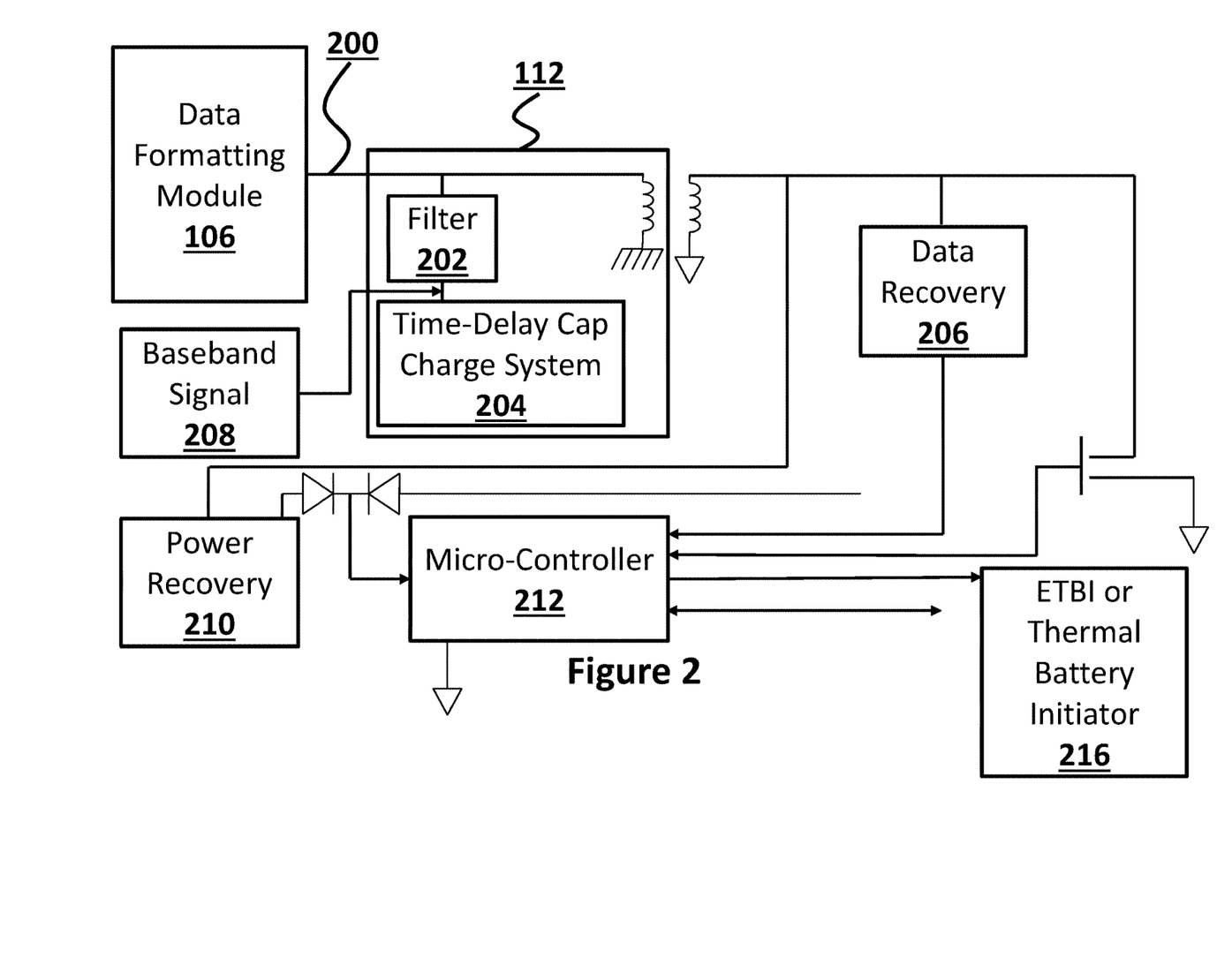
FIG. 2 is a block diagram showing electrical connections between elements of an aircraft to warhead data interface, configured in accordance with embodiments of the present disclosure.

Now again regarding the ASI 102, this interface is usually on the aircraft 100 side of an aircraft-to-store umbilical cable 200, as is shown in FIG. 2. Some carriage configurations may not use an umbilical cable, 200 e.g., rail launchers. ASI 102 locations include pylons, conformal and fuselage hard points, internal weapon bays and wing tips.

Umbilical cabling 200 may be used to connect the ASI 102 directly to the store connector, such as the Mission Store Interface (MSI) 110. The MSI 110 is the interface connecting a mission store to the rest of the system. In other words, it is the interface on the mission store structure to which the aircraft 100 or carriage store is electrically connected. This interface 110 is on the mission store side of an aircraft-to-store umbilical cable 200, a carriage store-to-mission store umbilical cable 200, or a rail launcher cable/connector mechanism.

The ASI 102 can also connect, in embodiments and typically through an umbilical cable 200, to a Carriage Store Interface (CSI) 104, which may be done to tie in multiple mission stores. The CSI 104 is the interface on the carriage store structure to which the aircraft 100 is electrically connected. This interface is on the carriage store side of an umbilical cable 200.

The CSI 104 is then, in embodiments, connected to a precision guided weapon systems data formatting module 106, which interprets and reformats data, which, in embodiments, may be UAI/1760 data, for use by a microcontroller 114/212, which, may also be referred to as a "Mission Chip" 212, and related circuitry 114 as well as by a precision guided weapon systems guidance system 116 and Thermal Battery Initiator (TBI) 216/302.

The CSI 104 may then connect, through the precision guided weapon systems data formatting module 106, to Carriage Store Station Interfaces (CSSIs) 108. A CSSI 108 is the interface on the carriage store structure to which the mission store is electrically connected. The CSSI 108 is usually on the carriage store side of the carriage store-to-mission store umbilical cable 200. Some carriage stores, such as rail launchers, may not use an umbilical cable 200 but use some other cable/connector mechanism.

These CSSIs 108 then connect to MSIs 110, usually via umbilical cables 200. The CSSI 108 to MSI 110 umbilical 200, in embodiments, is a Manchester-Encoded single wire with appropriate shielding. In embodiments, data such as a thermal battery (TB) initiation signal, the position relative to a target, rocket roll clocking, rocket Euler angles, rocket heading, rocket velocity prior to launch, and fuse time delay may be transferred over this link.

In fact, in embodiments, almost any type of data may be transmitted over umbilical 200 and stored in the memory of the micro-controller and related hardware 114, which may be powered, in embodiments, by the data signal itself. On missile activation, which, in embodiments, may be accomplished by the detection of an accelerative force indicating a missile launch, the precision guided weapon system 116 checks the memory of the micro-controller and related hardware 114 for data and overwrites data in its own registers with such data, if present, on the assumption that data in the micro-controller and related hardware 114 was programmed following launch and is more current than that programmed into the precision guided weapon system 116 prior to launch.

For example, if a pilot intended to change a missile code to change the designator that a laser-guided missile will lock onto following launch, the pilot would enter the new code into his aircraft's 100 computer system. The aircraft 100 would then send the signal over umbilical 200. The sending of the signal itself, in embodiments, would provide sufficient power to the micro-controller and related hardware 114 to turn such hardware on. On receipt of this information, the micro-controller and related hardware 114 would write such information into memory. On missile activation, the precision guided weapon system 116 would scan the memory of the micro-controller and related hardware 114 and, upon finding a new missile code, overwrite the pre-programmed data, thus accomplishing the change without powering on the missile prior to launch and without the addition of relatively complex wiring that would require a relatively more complex missile disengagement procedure.

Now referring to FIG. 2, a block diagram showing electrical connections between elements of an aircraft 100 to warhead 112 data interface, configured in accordance with relatively low-power embodiments of the present disclosure is shown. In such embodiments, a precision guided weapon systems data formatting module 106 is connected, via an umbilical cable 200, to a time-delay cap charge system 204 that is used to set a delay time for detonating the warhead 112 it is contained within. A filter 202 may be inserted between the precision guided weapon systems data formatting module 106 and the time-delay cap charge system 204 to prevent inadvertent setting of the warhead's 122 time-delay fuse.

In embodiments, a baseband signal 208 is used to set the time-delay cap charge system 204 delay. In some cases, a baseband signal 208 may be used to set the time delay of the time-delay cap charge system 204. The aforementioned components are then connected to the remaining components through an inductive coupling or other arrangement. Specifically, the precision guided weapon systems data formatting module 106 is in further communication with a data recovery module 206, a power recovery module 210 and a microcontroller 212, which is in operative communication with an ETBI or TBI 216, which is used to power the store following its disconnection from the host. The microcontroller 212 is also in direct operative communication with the data recovery 206 and power recovery 210 modules. Although the umbilical cable 200 of this embodiment is described as useful for setting fuse timing, it may also be used to transmit any data, as described above, with reference to FIG. 1.

Figure 3:
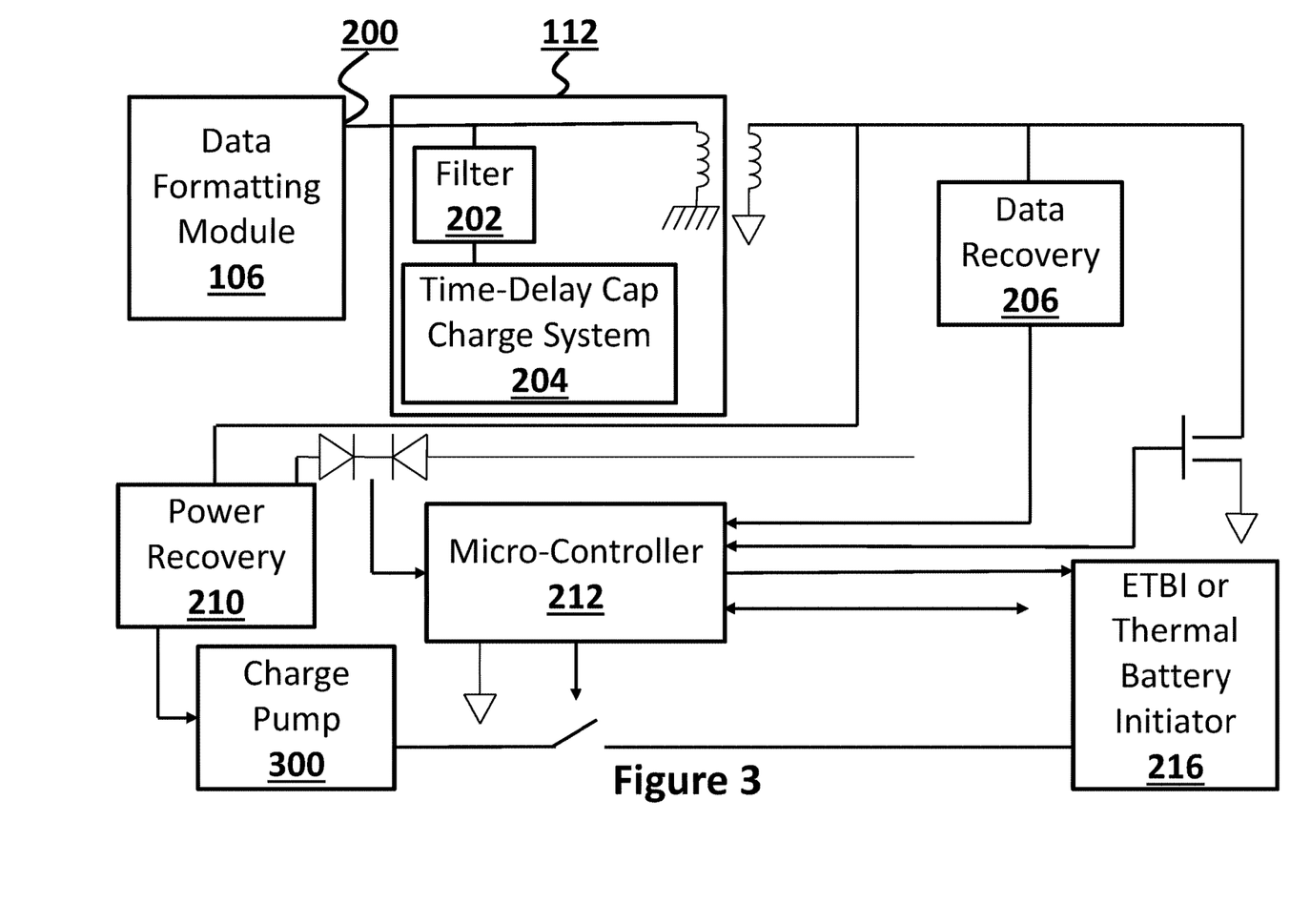
FIG. 3 is a block diagram showing electrical connections between elements of a relatively high power version of an aircraft to warhead data interface, configured in accordance with embodiments of the present disclosure.

Now referring to FIG. 3, a block diagram showing electrical and communication connections between elements of a single-wire microcontroller 212 embodiment that allows initiation of the munitions thermal battery, configured in accordance with embodiments of the present disclosure, is shown. As compared to the diagram shown in FIG. 2, a charge pump 300 in switched, operative communication with the ETBI/TBI 216 is added to the circuit.

Figure 4:
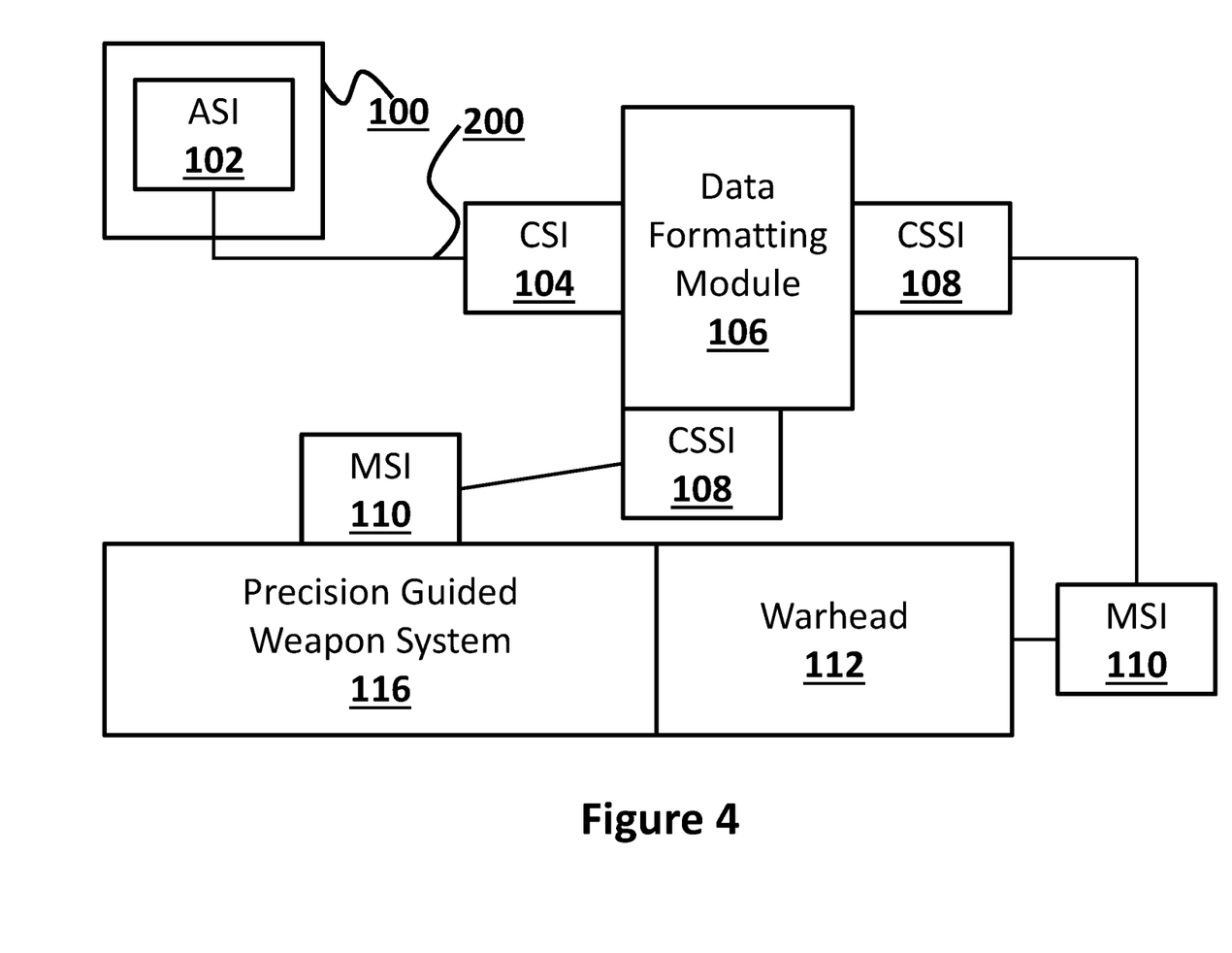
FIG. 4 is a block diagram showing electrical connections between elements of an aircraft to warhead data interface that incorporates dual CSSI and MSI modules for communications, configured in accordance with embodiments of the present disclosure.

Now referring to FIG. 4, a block diagram showing electrical connections between elements of a high-power aircraft to warhead data interface that incorporates dual CSSI and MSI modules for communications, configured in accordance with embodiments of the present disclosure, is shown. In such embodiments, an ASI 102 is connected to a CSI 104 in operative communication with a precision guided weapon systems data formatting module 106. The precision guided weapon systems data formatting module 106 is then in further operative communication with two CSSI 108, which are each in operative communication with a MSI 110. Of those MSIs 110, one, in embodiments, is interfaced to the warhead 112 portion of a missile while the other interfaces with the precision guided weapon systems guidance section 116 thereof, thereby enabling the precision guided weapon systems guidance section 116 to be fully powered prior to launch.

Figure 5:
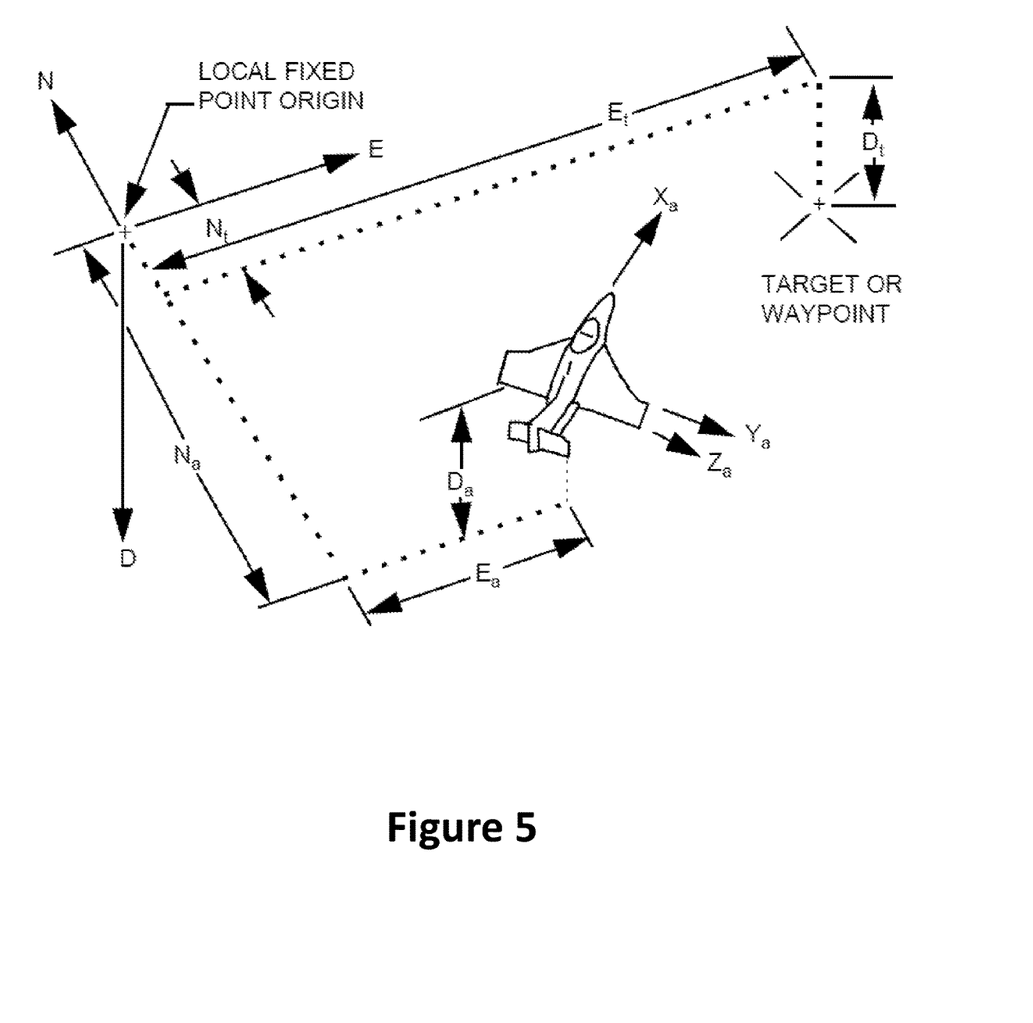
FIG. 5 is an illustration of a coordinate frame for inertial navigation target data showing aircraft, target and waypoint positions X, Y, and Z relative to a fixed point, configured in accordance with embodiments of the present disclosure.

Now referring to FIG. 5, an illustration of a coordinate frame for inertial navigation target data showing aircraft, target and waypoint positions X, Y, and Z relative to a fixed point, configured in accordance with embodiments of the present disclosure, is shown.

Figure 6:
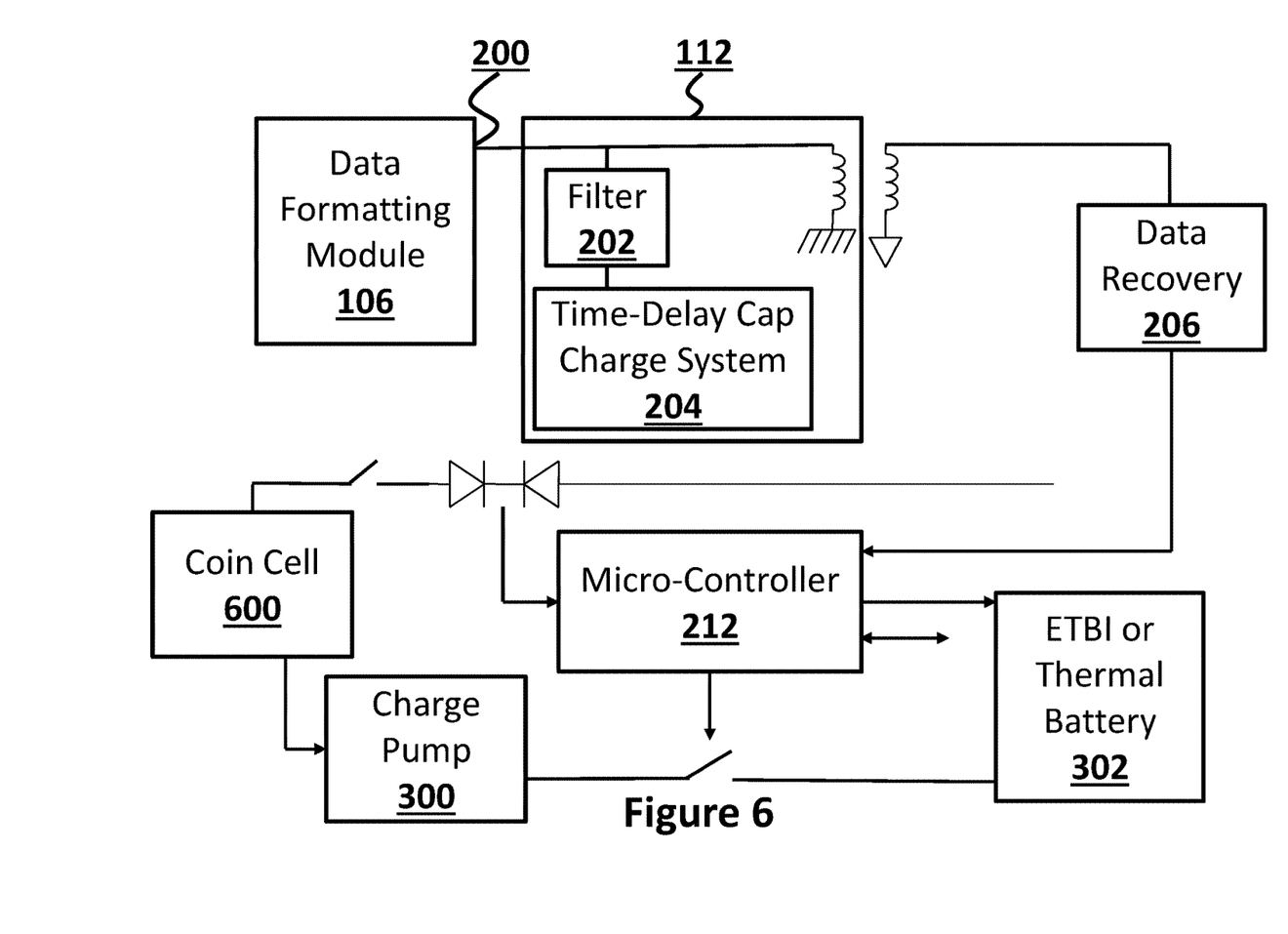
FIG. 6 is a block diagram showing electrical connections between elements of an aircraft to warhead data interface incorporating a coin cell, configured in accordance with embodiments of the present disclosure.

Now referring to FIG. 6, a block diagram showing electrical connections between elements of an aircraft to warhead data interface incorporating a coin cell 600, configured in accordance with embodiments of the present disclosure, is shown. Embodiments configured in accordance with FIG. 6 are similar to those of FIG. 3, but substitute a coin cell 600 for the power recovery module 210 of FIG. 3.

Figure 7:
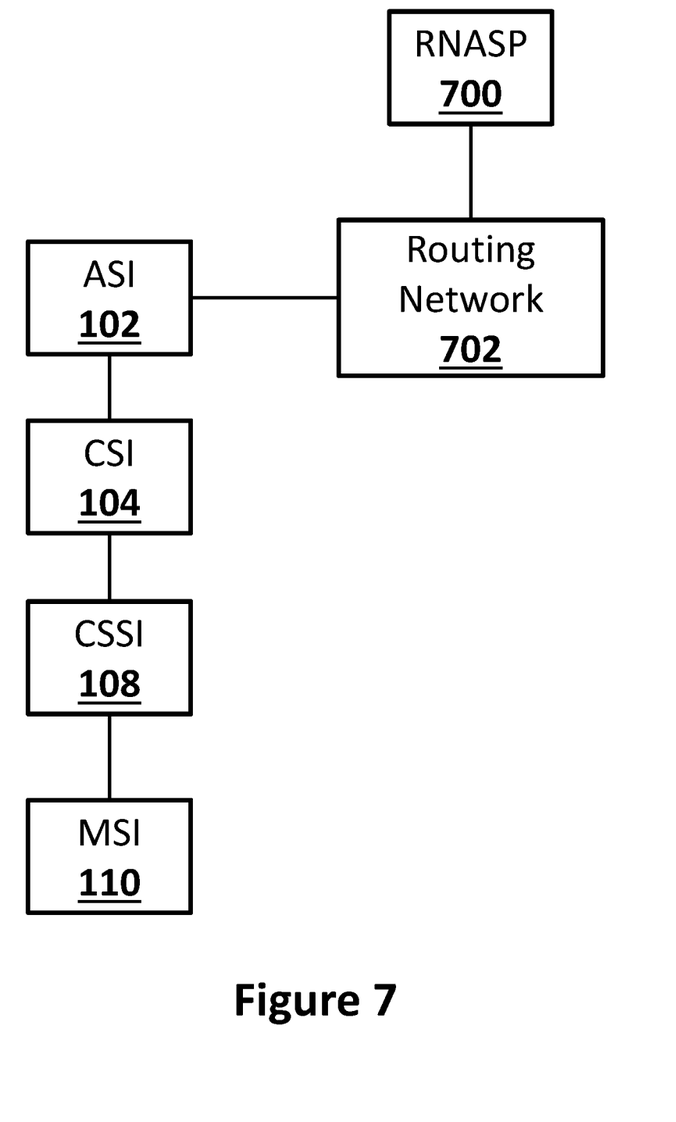
FIG. 7 is a block diagram showing a routing network aircraft subsystem port configured to allow store to aircraft and aircraft to store communication via a carriage store, configured in accordance with embodiments of the present disclosure.

Now referring to FIG. 7, a block diagram showing a routing network aircraft subsystem port (RNASP) 700 configured to allow store to aircraft 100 and aircraft 100 to store communication via a carriage store, in accordance with embodiments of the present disclosure, is depicted. In this context, an RNASP 700 should be understood to refer to the electrical interface between a high or low bandwidth network and other subsystems within the aircraft 100. This interface point is defined in order to identify the "aircraft" 100 end of the high bandwidth and low bandwidth networks and allows network performance to be specified in two-port network terms.

In embodiments, such as that depicted in FIG. 7, the RNASP 700 interfaces with a routing network 702, which is in operative communication with an ASI 102, which itself is in operative communication with a CSI 104, the CSI 104 being in operative communication with a CSSI 108, wherein the CSSI 108 is itself in operative communication with an MSI 110.

Figure 8:
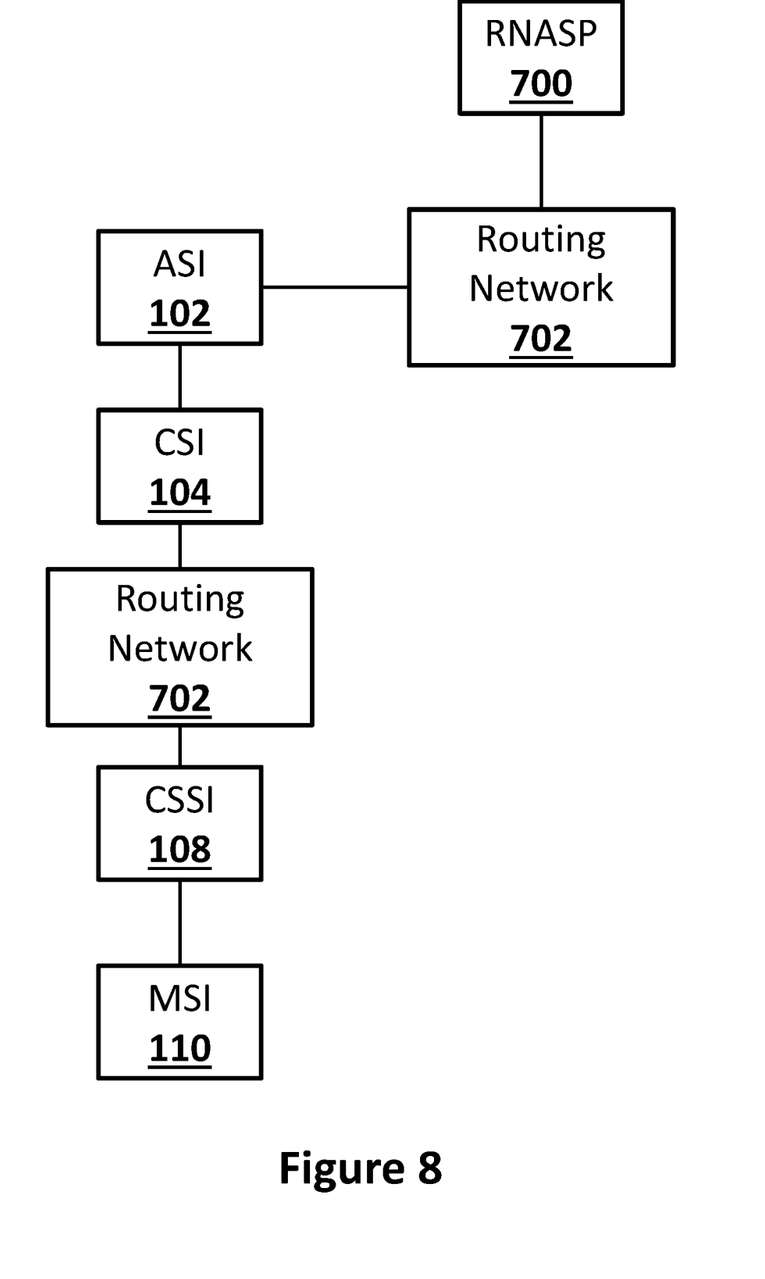
FIG. 8 is a block diagram showing an alternate configuration of a routing network aircraft subsystem port configured to allow store to aircraft and aircraft to store communication via a carriage store, configured in accordance with embodiments of the present disclosure.

Now referring to FIG. 8, a block diagram showing an alternate configuration of a RNASP 700 configured to allow store to aircraft and aircraft to store communication via a carriage store, in accordance with embodiments of the present disclosure, is depicted. In such embodiments, the RNASP 700 interfaces with a routing network 702, which is in operative communication with an ASI 102, which itself is in operative communication with a CSI 104, the CSI 104 being in operative communication with a second routing network 702, the second routing network 702 being in operative communication with a CSSI 108, wherein the CSSI 108 is itself in operative communication with a MSI 110.

Integration of improved embodiments of precision guided weapon systems 116 platforms allowing such additional functionality described herein typically requires few, if any, modifications to the host aircraft. In embodiments of the present disclosure, the required data is modulated and superimposed on the baseband signal, which was previously only used to set a detonation time.

In embodiments, a small, low-power, microcontroller may be embedded into the precision guided weapon systems 116 guided missile and a corresponding precision guided weapon systems data formatting module 106 may be included in the launcher pylon of the host aircraft 100. The precision guided weapon systems data formatting module 106 of such embodiments is configured to interface, on one side, to an aircraft data bus, and, on the other side, to the microcontroller 212 described herein.

In embodiments, the micro-controller 114/212 may be powered by the modulated data activity itself, so that it is not necessary to power-up the precision guided weapon systems 116 guidance system to transfer the data to the system. This configuration allows mission critical data to be loaded continuously, in the background, prior to launch and without powering up precision guided weapon systems 116. The precision guided weapon systems 116 of such embodiments, once turned on (generally just after missile launch) would then read data that had been written to the micro-controller 114/212 since last power-on and overwrite any data in its own registers with data from the micro-controller 114/212, if that same data type is present.

As an aside, although precision guided weapon systems 116 are not normally powered on before launch, guided missiles are often powered up by the host aircraft 100 prior to launch in order to be checked for health status, to load mission critical data prior to launch, and, in some cases, to verify that a target return is free from back-scatter. Embodiments of the present disclosure, which are described herein, improve on the prior art systems by not requiring missiles used with precision guided weapon systems 116 to be fully powered-on by a host, which, in embodiments, is a host aircraft 100, when changing programming, performing health checks, or taking other actions and by allowing existing interfaces to be used with little to no modification.

In further embodiments, at the desired time of launch, either of two modes is employed. In the first mode, the rocket is simply launched. After power-up, the onboard system interrogates the microcontroller 212 for the mission critical data. This mode assumes that monitoring of rocket's motion is not required during the first ~0.5 seconds of the flight. In the second mode, the missile can be commanded to turn itself on with a coded or "complex" message, which, in embodiments, is powered by its own internal power source, via the same interface used to transfer data. A coded or complex message may comprise data in a variety of forms, for example a portion of a song. In embodiments where the second mode is implemented, launch is then scheduled to take place a pre-determined time after power-on, once onboard processor and inertial sensors are ready to go, which may be on the order of approximately 1 second.

In further embodiments, if the missile detects a problem within itself during the pre-launch power-on delay, the same communications channel is used to signal the host aircraft 100 that there exists a problem, allowing the host aircraft 100 to decide to cancel the launch or launch despite the issue. In embodiments, the interface uses the same umbilical cable 200 already in place between the host and the missile, which carries a baseband low frequency signal. In embodiments, the data is transmitted on the same line at an A/C frequency well above the frequency content of the baseband signal. Embodiments also combine data and clock using the known Manchester encoding scheme, or similar, as would be known to one of ordinary skill in the art. The very low power required for the interface may be derived from the data activity itself.

Although the interface described above, for this application, requires only volatile memory, additional applications of the basic technique may be realized through the use of non-volatile memory. Physical implementation of the interconnection can be a single electrical contact, but inductive, capacitive, or optical coupling methods may also be useful, being mindful of the EMI/EMC (Electro-Magnetic Interference/Electro-Magnetic Compatibility) requirements, materials used, requirements where no-physical-contact is desired or required for any reason, and keeping the implementation simple and inexpensive.

In embodiments, the microcontroller 212 interface requires less than 0.1 Watts of power from the host platform. Some embodiments require only 1 low current umbilical to nose wire 200, which may be the same wire that is currently used for time delay fuses.

In embodiments, a low data rate is used, which is acceptable since data, including INS data, TBI, Laser Code, GPS, etc., is typically loaded in the background.

In embodiments, wing deploy, i.e. the extension of previously-retracted wings of a rocket or missile that may be used for guidance and/or enhancing the range of the projectile, is controlled via a wing deploy delay table, which may be periodically updated during a mission.

In embodiments, a pre-Launch Built-In-Test (BIT), conducted by guidance electronics, is used to provide a Launch Abort signal.

In embodiments, the precision guided weapon systems data formatting module 106 uses a 1760 bus to gather Inertial Navigation Sensor (INS) data and re-format it for transmission to the precision guided weapon system 116.

In embodiments, rocket body rates are integrated through fly-out, which, in some cases, will require the roll orientation of the projectile in the launch tube to be known.

Various embodiments may utilize a single wire interface to a nose of the missile, i.e. the warhead 112 area, which is comparable with existing "time-delay" fuse setting connections.

In embodiments, the microcontroller 114/212 uses a single connection to provide power and data to the precision guided weapon systems guidance system 116. This connection may be an inductive coupling or a physical contact. In such embodiments, data is modulated on the power signal. The microcontroller 114/212 itself may be configured to store the required INS data in local memory and can be re-loaded at any time prior to launch. In some cases, the INS data is updated on a recurring basis during a mission. The microcontroller 114/212 may also be used to decode a Thermal Battery Initiator (TBI) 216, which, in embodiments, may be an Electronic Thermal Battery Initiator (ETBI) 216, initiation message and fire a Thermal Battery (TB), which can then be used to power-up the precision guided weapon system 116 (including the microcontroller 114/212) prior to launch. In some cases, the TBI 216 is an Electronic Thermal Battery Initiator (ETBI) 216. TBIs 216 and ETBIs 216, as used herein, refer, respectively, to devices and electrical circuits that provide a mechanical output that is used to initiate a thermal battery.

In other embodiments, where the missile is fully-powered prior to launch, approximately 20-25 Watts of power may be required from a host platform. To provide this amount of power to the missile, such embodiments may utilize a multi-pin, 1 Amp umbilical cord 200. These embodiments may utilize a connection to an MSI 110 directly connected to the precision guided weapon system 116 for at least power and/or data, as shown in FIG. 4. In these embodiments, wing deploy is suppressed during the period of time the projectile is inside a launch tube and triggered after launch. Such embodiments have the advantage of allowing a detailed pre-launch BIT.

Both low and full power embodiments may feature upgraded Inertial Measurement Units (IMUs) and electrical triggering of a thermal battery.

Regarding launch abort options, present rotary and fixed wing precision guided weapon system 116 variants using a single wire connection to a host aircraft 100 do not have the ability to run Built-In Tests (BITs), and prevent a launch if a problem is detected. In embodiments including a guidance electronics assembly, such assembly is not powered while the microcontroller 114/212 is recurrently loaded with INS data during the moments prior to launch. In embodiments using a thermal battery, following initiation of the thermal battery, i.e. when it takes over powering the system, a Power-On BIT (PBIT) is executed to assess the basic functionality of a guidance computer, seeker, which detects the direction of a source of laser energy in laser-guided missiles and adjusts the projectile trajectory towards the source, IMU, and Control Actuator System (CAS), which is used to provide aerodynamic control authority for missile and tactical control systems. In embodiments, should one or more sub-systems fail the PBIT, the microcontroller 114/212 is used to signal that there is a problem by shorting the power/data line from the data formatting module 106. The precision guided weapon system's 116 data formatting module 106 monitors the impedance of the power/data line, and, if a short is detected, the precision guided weapon systems data formatting module 106 utilizes the 1760 bus to prevent launch and ceases activity on the power/data line. If the thermal battery fails to initiate, the shorting of the power/data line will be brief, otherwise it will be continuous. If the thermal battery has activated but an abort is indicated, the battery will heat-up and produce power for several minutes. It has been confirmed by testing that the battery cannot inadvertently initiate the rocket motor.

In embodiments, the precision guided weapon systems data formatting module 106 functions may be described as follows:

If the microcontroller 114/212 option is selected, pass the baseband "Time Delay" signal for fuse setting to the guidance section using a standard 1-wire umbilical 200; communicate on a UAI/1760 bus to gather INS and other data as necessary; generate an AC power/data signal to convey power and INS data to the microcontroller 114/212 via the same wire that carries the time delay signal (power required may be 0.1 watts or less, data may be satisfactorily modulated using a number of schemes as would be apparent to one of ordinary skill in the art); approximately 1 sec prior to launch, activate a thermal battery; monitor the AC impedance of a power/data line—if a short is detected, utilize the 1760 bus to prevent launch and cease activity on the power/data line;

If the full pre-power option is selected: pass a baseband "Time Delay" signal for fuse setting to the guidance section using a standard 1-wire umbilical 200; communicate on a UAI/1760 bus to gather INS and other data as necessary; apply power, two-way data communications, and wing deploy inhibit signals to an precision guided weapon systems 116 guidance section; command PBIT, and transmit INS data to the precision guided weapon systems 116 guidance section; use received PBIT status to enable or prevent launch via the 1760 bus; activate the thermal battery only if BIT passes; and launch after TB has taken over power.

In embodiments, at least 3 accelerometers are used in the precision guided weapon systems 116 guidance section.

In embodiments, high-bandwidth roll gyros are used in the precision guided weapon systems 116 guidance section.

In embodiments, electrical energy conservation algorithms are used in the precision guided weapon systems 116 guidance section.

In embodiments, the microcontroller 114/212 only requires very small operating power, for example 3.3V or less at ~30 ma or less.

In embodiments, battery activation is achieved by complex messaging, to avoid false triggering.

In embodiments requiring a large current impulse to activate the battery, a charge pump may be used.

In summary, a simple, 1-wire interface to an upgraded precision guided weapon systems that allows inertially guided precision guided weapon systems operations is presented. In low-power embodiments, standard interface cabling, requiring no new connectors, may be used. Embodiments allow time delay fusing to be set in same manner as in present units. In embodiments, precision guided weapon systems INS data loads in the background. In embodiments, after receiving the TB initiation command, launch can occur in ~1 sec. Minimal modification to, for example, the XM283 warhead is required. In embodiments, launch can be aborted if guidance section BIT fails. In embodiments, a heated sleeve within the launch tube is used to elevate booster and/or guidance section temperature above −40° C., if necessary.

In embodiments, a full pre-power option is implemented, but such an option requires more extensive modifications to all sides of the interface, although these embodiments do allow a more detailed BIT to be conducted prior to launch.

Although the terms and examples described herein refer to an air-to-ground guided missile, the technology described may be used for any application in which critical data, i.e. data required for a device to complete its function, needs to be transmitted to the device before it is powered on. Embodiments of the present disclosure may also be used in any application where a simple interface is desired or required and cases where it is problematic to activate a device prior to being certain it will be used. In fact, any situation in which data needs to be conveyed to a system while it is turned off, for use by the system after power is eventually applied, could use the techniques and concepts described. This avoids having to power systems up in order to convey information to them, greatly simplifying the interfaces between such systems and their host.

One example where such teachings could benefit a commercial industry would be in the use of emergency transponders or locator devices. In this example, a host system, such as a GPS, could be configured to continuously update an emergency locator, without turning the emergency locator on (improving viable power options, e.g. the use of a thermal battery), with a present position. In the event the emergency locator is activated, it could then transmit the latest known position, even if the GPS system was no longer active and despite the emergency locator never having powered-on following activation.

The foregoing description of the embodiments of the disclosure has been presented for the purposes of illustration and description. It is not intended to be exhaustive or to limit the disclosure to the precise form disclosed. Many modifications and variations are possible in light of this disclosure. It is intended that the scope of the disclosure be limited not by this detailed description, but rather by the claims appended hereto.

What is claimed is:

1. A system for transferring at least one of power and data on a host aircraft over a single-wire umbilical cable, the system comprising:
   a host-store interface on the host aircraft configured to allow the transferring of at least one of power and data from the host aircraft over the single-wire umbilical cable; and
   a store in operative communication with the host-store interface through said single-wire umbilical cable, said store comprising a microcontroller and memory operatively coupled thereto, wherein said microcontroller and store are independent of any guidance, control, or other systems necessary for normal operation of the store and wherein said microcontroller is configured to be powered by and receive and store data into said memory from said host-store interface through said single-wire umbilical cable without requiring additional electronic systems of the store to be powered on.

2. The system of claim 1 wherein said microcontroller and said memory derives power only from a data signal provided thereto by the host-store interface.

3. The system of claim 1 further comprising a store control system comprising memory having pre-programmed data thereon that is configured to be powered by the store during use of the store.

4. The system of claim 3 wherein said store control system, upon being powered on, is configured to read the contents of the memory operatively coupled to said microcontroller and to replace its own pre-programmed data with data contained on the memory operatively coupled to said microcontroller.

5. The system of claim 4 wherein said store control system comprises a store guidance system.

6. The system of claim 3 wherein said data contained on the memory operatively coupled to said microcontroller comprises a laser code indicative of a specific laser-designator pulse interval.

7. The system of claim 1 wherein said microcontroller is configured to conduct a pre-launch test of the store and abort a launch if the pre-launch test fails.

8. The system of claim 7, wherein the abort is signaled by shorting at least one of the power and data connections of the host-store interface to ground.

9. The system of claim 1 further comprising a battery configured to provide electrical power to said store, during use, wherein battery activation is achieved by complex messaging, thereby avoiding false triggering.

10. The system of claim 1 wherein transferring data to the store comprises modulating the data and superimposing it on a baseband time delay signal that may also be used for fuse setting, thereby minimizing the need for additional wiring between the host and the store contained thereon.

11. A method of reprogramming a mission store prior to launch from a host aircraft comprising:
   passing a data signal from said host aircraft to a microcontroller contained onboard said store and having memory operatively coupled thereto, wherein the data signal passed to said microcontroller also provides power to said microcontroller, thereby enabling it to function without a provision of further power, and wherein passing of the data and power is done using a standard 1-wire umbilical;
   communicating data to said microcontroller;
   writing said data to the memory operatively coupled to said microcontroller;
   on a store computer system contained on said store and having previously-programmed memory to be reprogrammed, upon powering-on of the store, using the store computer system to read said data from the memory operatively coupled to said microcontroller;
   comparing said data read from the memory operatively coupled to said microcontroller and the previously-programmed memory of said store computer system; and
   replacing the contents of the previously-programmed memory of said store computer system with that of the memory operatively coupled to said microcontroller, if differing data is present thereon.

12. The method of claim 11 wherein the battery is a thermal battery.

13. The method of claim 11 wherein said data comprises a laser code indicative of a specific laser-designator pulse interval.

14. The method of claim 11 wherein said data comprises inertial navigation system data.

15. The method of claim 11 wherein communicating data to the store comprises modulating the data and superimposing it on a baseband time delay signal that may also be used for fuse setting, thereby minimizing the need for additional wiring between the host and the mission store.

* * * * *